United States Patent
Michael (12)

(10) Patent No.: US 6,268,002 B1
(45) Date of Patent: Jul. 31, 2001

(54) METHOD FOR MAKING GRAPE LEAVES WITH MEAT

(76) Inventor: Patrick T. Michael, 539 Chapel Rd., Aliquippa, PA (US) 15001

(*) Notice: Subject to any disclaimer, the term of this patent is extended or adjusted under 35 U.S.C. 154(b) by 0 days.

(21) Appl. No.: 09/276,302

(22) Filed: Mar. 25, 1999

Related U.S. Application Data

(63) Continuation of application No. 08/764,765, filed on Dec. 12, 1996, now abandoned.
(51) Int. Cl.⁷ ....................................................... A23P 1/10
(52) U.S. Cl. ............................ 426/297; 426/92; 426/138; 426/289; 426/392; 426/512; 426/615
(58) Field of Search ..................................... 426/273, 275, 426/512, 415, 113, 129, 615, 392, 138, 297, 289, 92

(56) References Cited

PUBLICATIONS

Rombauer, et al., The Joy of Cooking Book, pp. 152–153, 1975.*

Ficklen, E., Article From the Washington Post Entitled, From the Grape Arbor Those Leaves are Good for More Than Just Shading the Fruit, Jun. 1985.*

* cited by examiner

*Primary Examiner*—Milton Cano
(74) *Attorney, Agent, or Firm*—Ansel M. Schwartz

(57) ABSTRACT

The present invention pertains to an apparatus for making grape leaves with meat. The apparatus comprises a mechanism for rolling a grape leaf about the meat. Additionally, the apparatus comprises a mechanism for positioning the grape leaf and meat so the rolling mechanism can roll the grape leaf about the meat.

1 Claim, 5 Drawing Sheets

--- FLAP POSITION WHEN FOLDING
— FLAP POSITION WHILE ROLLING

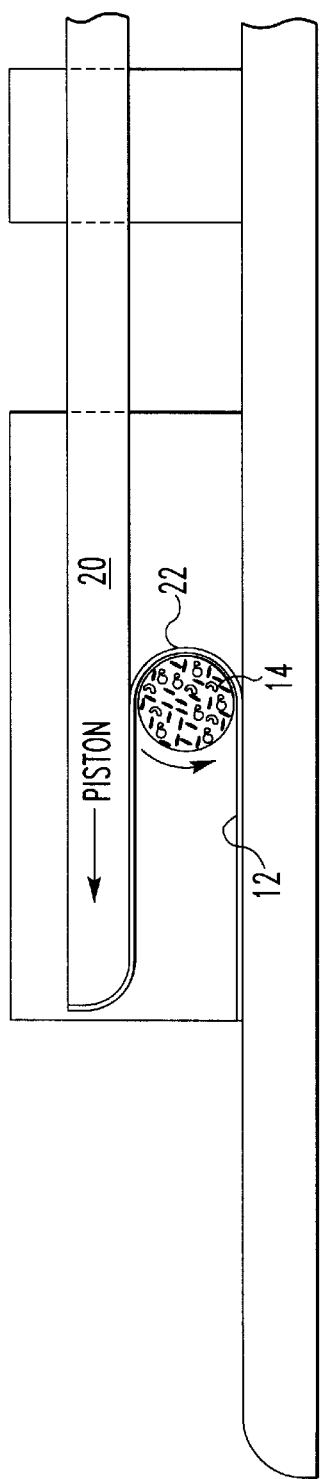
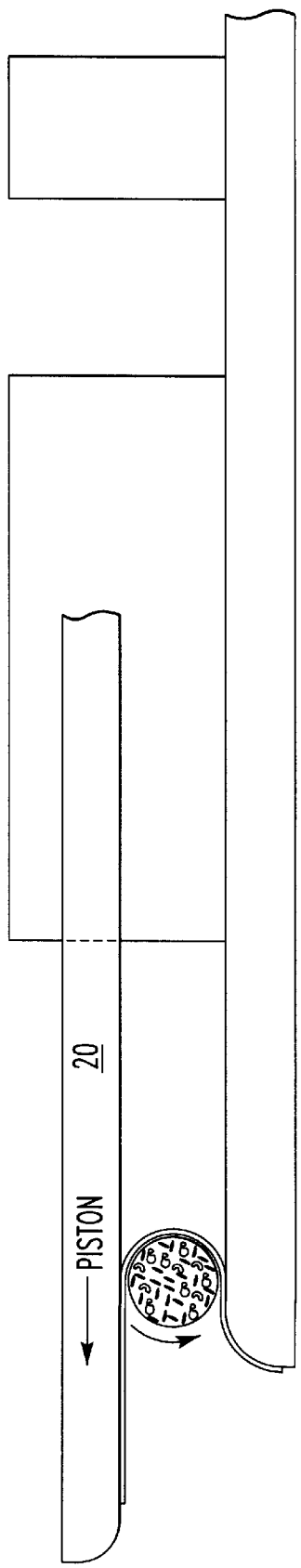

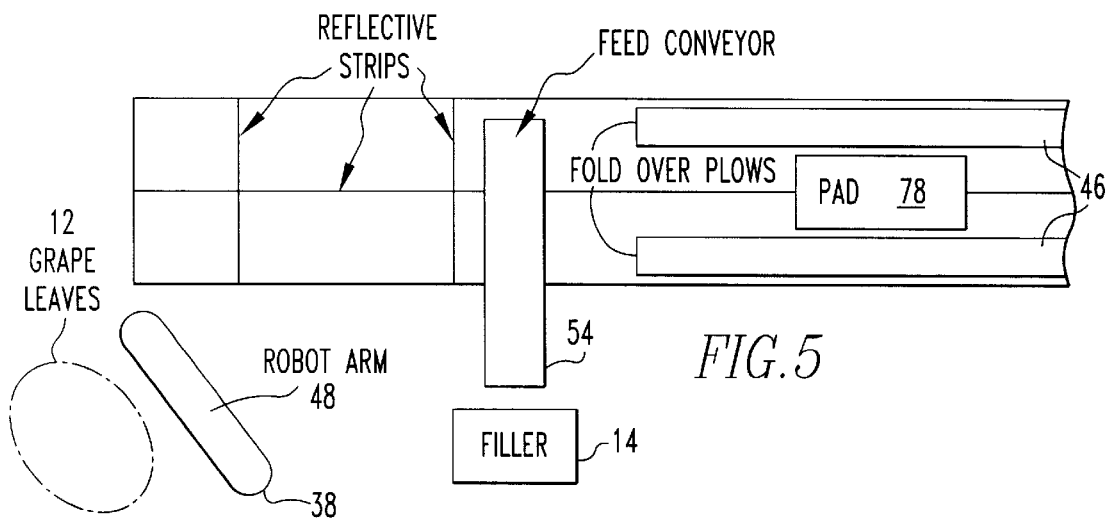
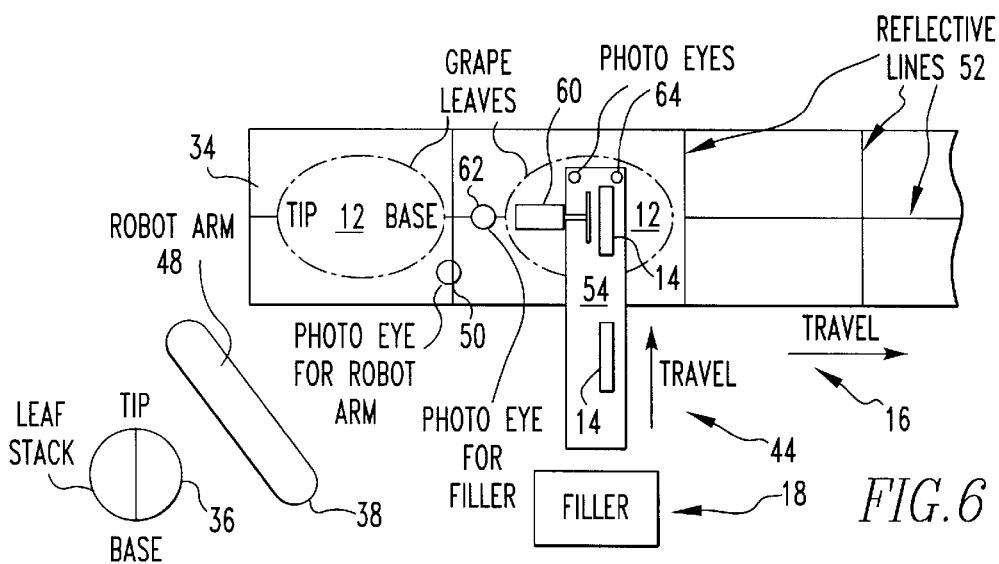
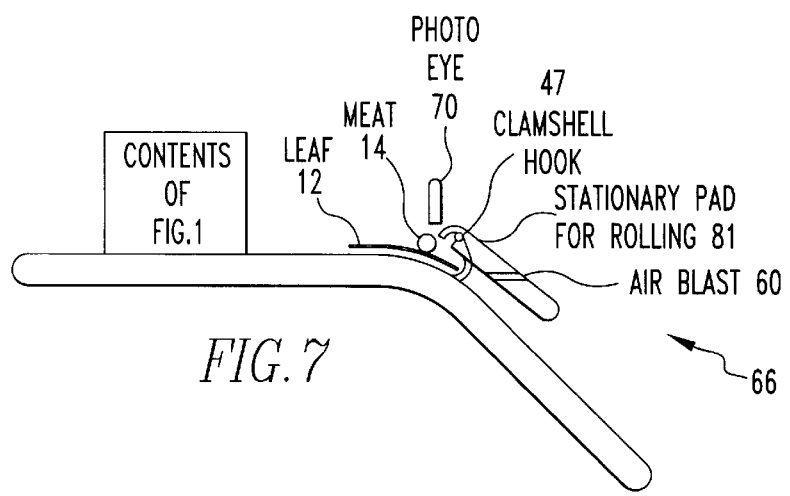

METHOD FOR MAKING GRAPE LEAVES WITH MEAT

This application is a continuation of U.S. application Ser. No. 08/764,765, filed Dec. 12, 1996, now abandoned.

FIELD OF THE INVENTION

The present invention is related to the rolling of a grape leaf around meat. More specifically, the present invention is related to the automatic rolling of the grape leaf around meat.

BACKGROUND OF THE INVENTION

Grape leaves which are rolled with meat are an enjoyable delicacy to large numbers of people. However, the manual rolling of grape leaves with meat is a time intensive process that could be better performed by machines. The present invention is directed to a machine which automatically rolls a grape leaf about meat and allows workers to perform other tasks than having to roll the grape leaves with meat.

SUMMARY OF THE INVENTION

The present invention pertains to a method and apparatus for making grape leaves with meat. The apparatus comprises a mechanism for rolling a grape leaf about the meat. Additionally, the apparatus comprises a mechanism for positioning the grape leaf and meat so the rolling mechanism can roll the grape leaf about the meat.

BRIEF DESCRIPTION OF THE DRAWINGS

In the accompanying drawings, the preferred embodiment of the invention and preferred methods of practicing the invention are illustrated in which:

FIG. 3 is a side view of a grape leaf being rolled about meat by the first embodiment of the invention.

FIG. 4 is a side view of a grape leaf wrapped about meat by the first embodiment of the invention.

FIG. 5 is an overhead view of a second embodiment of the invention.

FIG. 6 is an overhead view of the second embodiment of the invention with grape leaves and meat on it.

FIG. 7 is a schematic representation of a portion of the second embodiment detailing the clam shell.

DESCRIPTION OF THE PREFERRED EMBODIMENT

Figure 1:
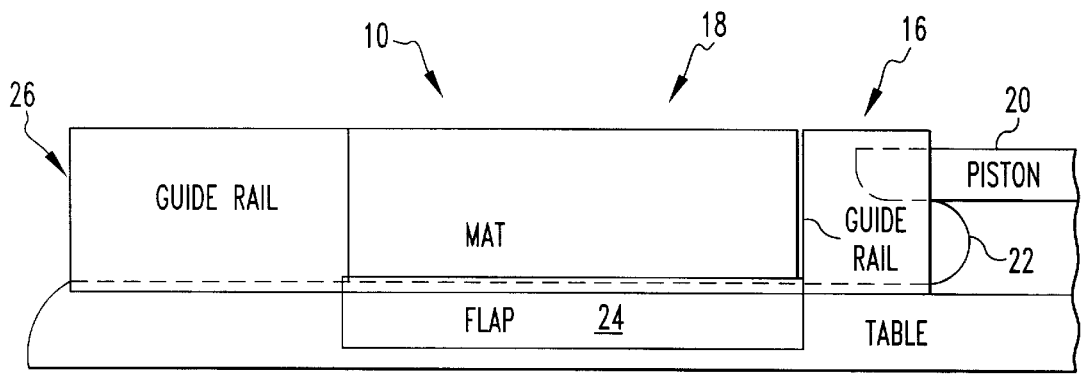
FIG. 1 is a side view of a first embodiment of the present invention.
Figure 2:
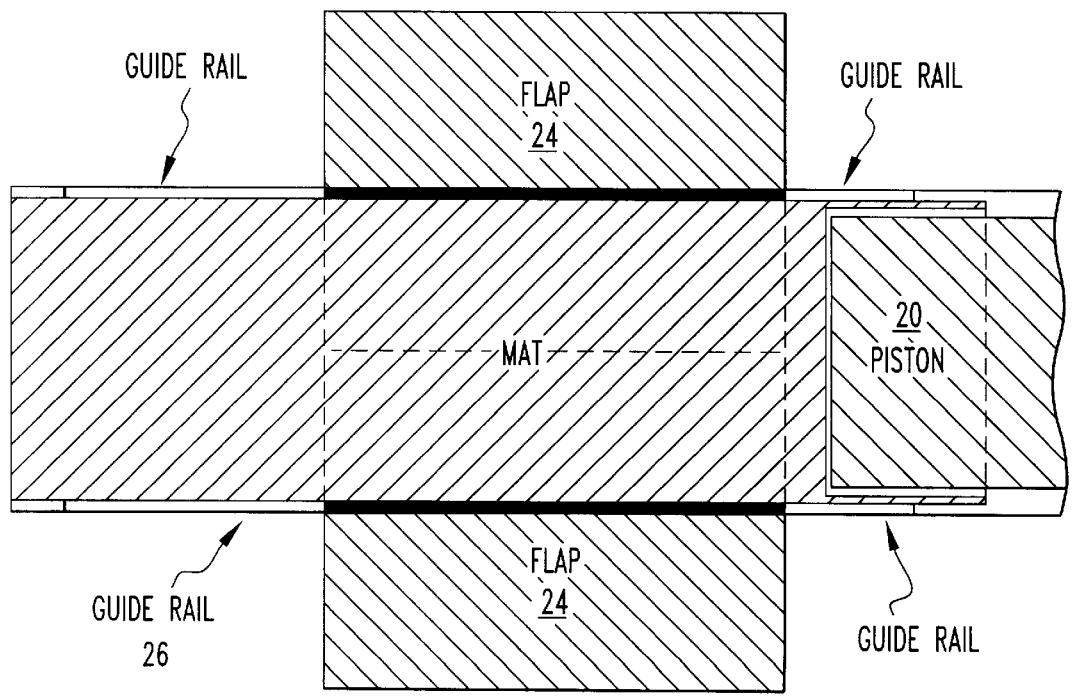
FIG. 2 is an overhead view of the first embodiment of the present invention.
Figure 8:
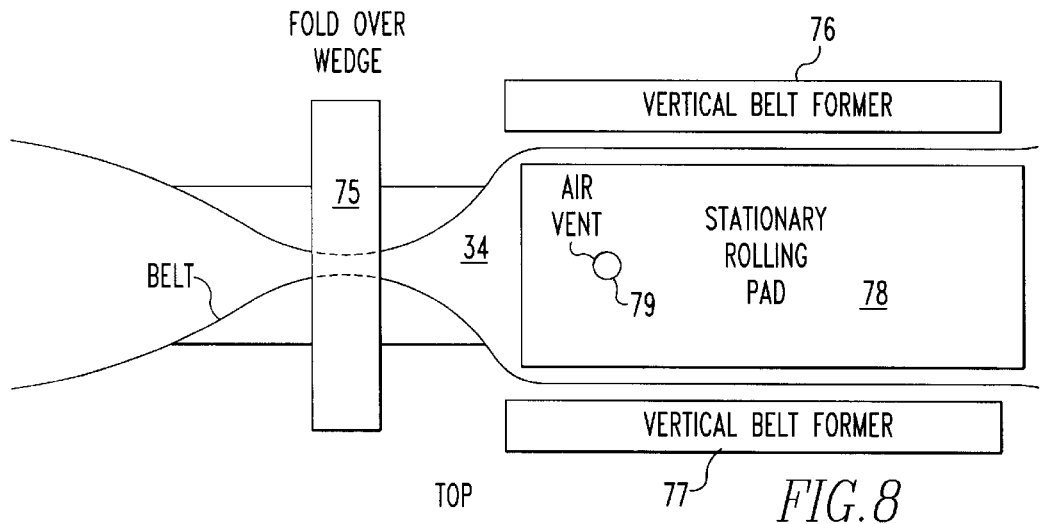
FIG. 8 is an overhead view of a portion of the third embodiment of the invention showing the fold over wedge and stationery rolling pad.
Figure 9:
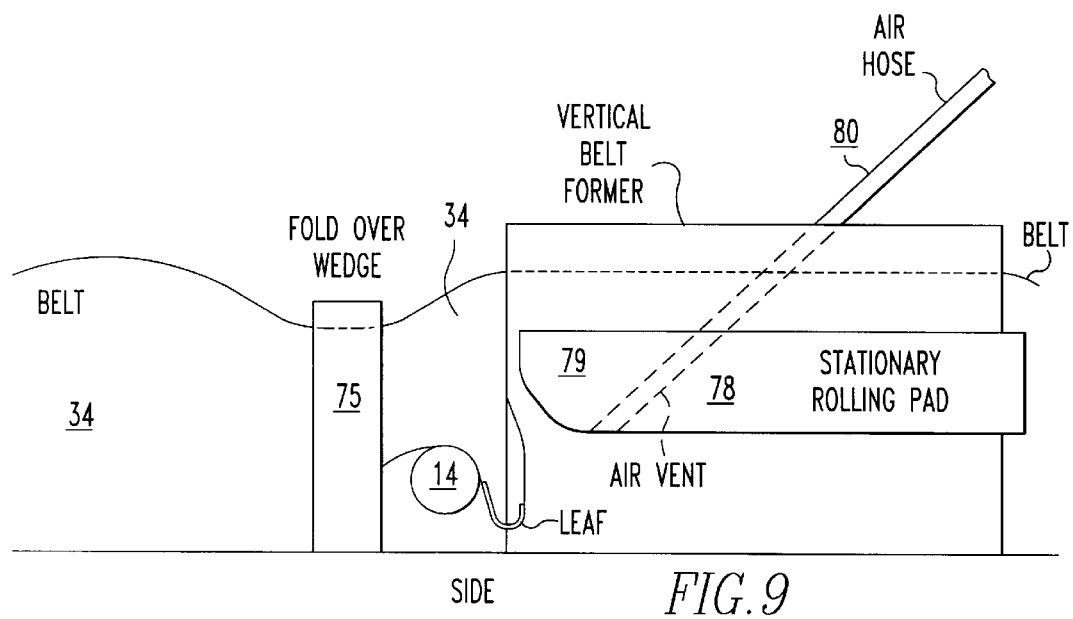
FIG. 9 is a side view of FIG. 8.
Figure 10:
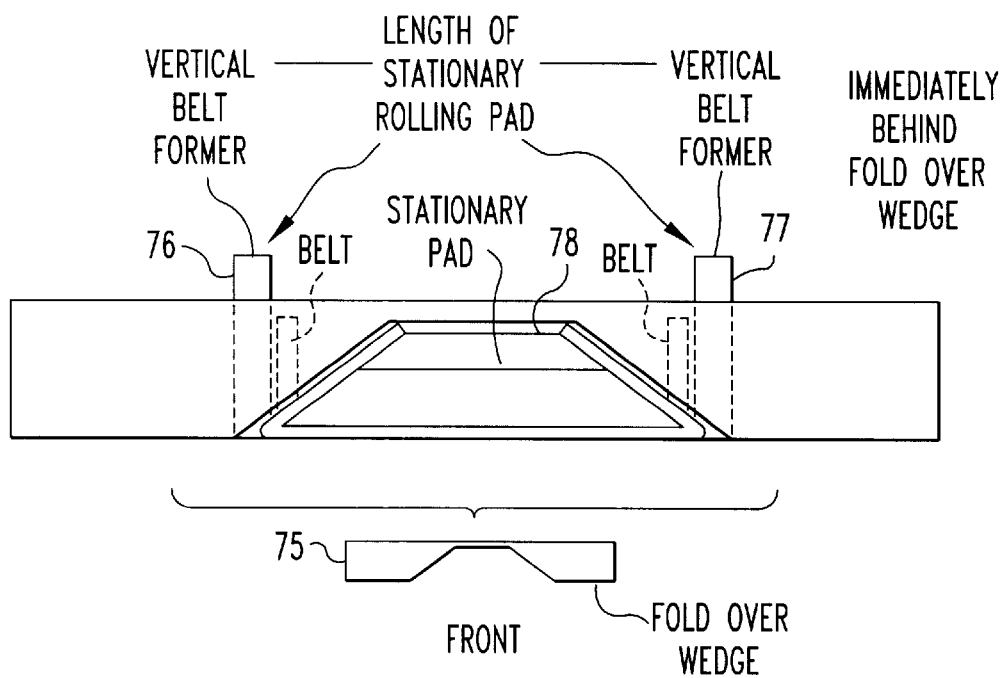
FIG. 10 is a front view of FIG. 8.

Referring now to the drawings wherein like reference numerals refer to similar or identical parts throughout the several views, and more specifically to FIG. 1 thereof, there is shown an apparatus 10 for making grape leaves 12 with meat 14. (It should be noted that in the preferred embodiment, meat 14 is rolled in the grape leaf. But, meat 14 is only one example of what can be rolled with the grape leaf. Instead of meat, a vegetable pate such as a rice based pack could be rolled.) The apparatus 10 comprises a mechanism 16 for rolling a grape leaf 12 about the meat 14. Additionally, the apparatus 10 comprises a mechanism 18 for positioning the grape leaf 12 and meat 14 so the rolling mechanism 16 can roll the grape leaf 12 about the meat 14.

The rolling mechanism 16 preferably includes a piston 20 that moves relative to the grape leaf 12, meat 14 and the positioning mechanism 18 to cause the grape leaf 12 to roll about the meat 14. Also, the rolling mechanism 16 preferably includes a rolling diaphragm 22 that is connected to the piston 20 and the positioning mechanism 18 and extends therebetween and across the positioning mechanism 18 so the grape leaf 12 and the meat 14 are disposed on the rolling diaphragm 22 on the positioning mechanism 18. The rolling diaphragm 22 moves with the piston 20 as the piston 20 moves relative to the positioning mechanism 18 which holds the grape leaf 12 about the meat 14. The rolling diaphragm 22 is preferably porous. The rolling mechanism 16 preferably includes a first conveyor belt 34 which moves the grape leaf 12.

The positioning mechanism 18 preferably includes flaps 24 upon which a grape leaf 12 is disposed when the flaps 24 are in an open position and between which meat 14 is disposed. The flaps 24 fold inwards to cover the meat 14 disposed between the flaps 24 and fold the grape leaf 12 over the meat 14 when the flaps 24 are in a closed position. The positioning mechanism 18 preferably also includes a guide mechanism 26 disposed along the rolling diaphragm 22 to guide the grape leaf 12 and the meat 14 as the grape leaf 12 wraps about the meat 14 and is moved by the rolling diaphragm 22. The positioning mechanism 18 preferably includes air cylinders 28 connected to the flaps 24 to move the flaps 24 in an open or closed position. The positioning mechanism 18 preferably includes a mechanism 30 for producing a jet of air through the porous rolling diaphragm 22 to lift the grape leaf 12 off of the rolling diaphragm 22 so it will not stick to the rolling diaphragm 22. The positioning mechanism 18 preferably includes a leaf supply 36 having grape leaves 12 and a mechanism 38 for transferring a grape leaf 12 from the leaf supply 36 to the first conveyor belt 34. Additionally, the positioning mechanism 18 preferably includes a filler supply 40 having meat 14 and a mechanism 44 for transferring meat 14 from the filler supply 40 to a grape leaf 12 on the first conveyor belt 34. Preferably the leaf transferring mechanism 38 includes a robot arm 48 disposed adjacent to the first conveyor belt 34 and the leaf supply 36. The robot arm 48 takes a leaf 12 from the leaf supply 36 and places the leaf 12 on the first conveyor belt 34.

Preferably, the rolling mechanism 16 includes fold over plows 46 disposed adjacent to the first conveyor belt 34 over which edges of the grape leaf 12 move as the first conveyor belt 34 moves the grape leaf 12. The fold over plows 46 are downstream of the mechanism 44 for transferring meat 14 to the grape leaf 12. The fold over plows 46 fold the sides of the grape leaf 12 over the meat 14 on the grape leaf 12. Moreover, the rolling mechanism 16 preferably includes a clamshell hook 47 extending down to the first conveyor belt 34 which catches the grape leaf 12 and causes it to roll over the meat 14 on the grape leaf 12. Preferably, the meat transferring mechanism 44 includes a second conveyor belt 54 in angular relationship with the first conveyor belt 34. The second conveyor belt 54 has a first end 56 disposed over the first conveyor belt 34 and a second end 58 disposed in contact with the filler supply 40 to receive meat 14 from the filler supply 40. The filler transferring mechanism 40 also includes a pusher mechanism 60 disposed adjacent to the first end 56 of the second conveyor belt 54 such that meat 14 on the second end 58 of the second conveyor belt 54 is pushed off of the second conveyor belt 54 onto the first conveyor belt 34 when the pusher mechanism 60 is activated. Additionally, the filler transferring mechanism 40 includes a second photo eye 62 disposed adjacent the pusher mechanism 60 to determine when the meat 14 is properly positioned relative to the pusher mechanism 60 to be pushed by the pusher mechanism 16. The second photo eye 62 is in communication with the pusher mechanism 60. The first conveyor belt 34 preferably angles downward downstream of the second conveyor belt 54 and adjacent to the clamshell hook 47 so the clamshell hook 47 catches the edge of the leaf 12 that extends over the first conveyor belt 34 as the first conveyor belt 34 angles downward and causes the leaf 12 to lift over the meat 14.

The positioning mechanism 18 preferably includes a first photo eye 50 disposed adjacent the first conveyor belt 34 to determine when the robot arm 48 has properly positioned the leaf 12 relative to the first conveyor belt 34 so the robot arm 48 releases the leaf 12 onto the first conveyor belt 34. The first photo eye 50 is in communication with the robot arm 48. Preferably, the first conveyor belt 34 has reflective areas 52 disposed at predetermined locations. The reflective areas 52 are associated with the first photo eye 50 so the first photo eye 50 can identify the respective areas 52.

The positioning mechanism 18 preferably includes a third photo eye 64 disposed adjacent the first conveyor belt 34 and upstream the second conveyor belt 54 to identify when the leaf 12 on the first conveyor belt 34 is positioned to receive the meat 14. The first photo eye 64 is in communication with the filler supply 40 and the pusher mechanism 60 so the meat filler supply 40 provides meat 14 to the second conveyor belt 54 at the desired time and the pusher mechanism 60 pushes meat 14 from the second conveyor belt 54 to the first conveyor belt 34 at a desired time.

The rolling mechanism 16 preferably includes a blower 66 blowing air through fold over plows 46 to provide a cushion of air that the edges of the leaf 12 float on and so the edges of the leaf do not stick to the fold over plows 46.

The apparatus 10 preferably also includes a mechanism 32 for automatically placing a grape leaf on the positioning mechanism 18.

Preferably, the apparatus 10 includes an air blaster 68 disposed to send a blast of air at the leaf 12 as the leaf edge extends over the first conveyor belt 34 as the first conveyor belt 34 angles downward to lift the leaf edge and roll the leaf 12 over the meat 14. Additionally, the apparatus 10 preferably includes a fourth photo eye 70 disposed adjacent the first conveyor belt 34 as the first conveyor belt 34 angles downward to identify when the edge of the leaf 12 is at the first conveyor belt 34 as the first conveyor belt 34 angles downward to activate the air blaster 68. The fourth photo eye 70 is in communication with the air blaster 60.

In the operation of the preferred embodiment, a robotic arm 48 with a suction cup will pick up a grape leaf 12 from a stack 36 of pre-stacked grape leaves 12. The suction cup will pick up the top leaf 12 only. The stack 36 will have all the leaves 12 pointing in the same direction. The robot arm 48 will use a first photo eye 50 to ensure correct placement of the leaves 12 onto the first conveyor belt 34. The direction of the leaf 12 on the first conveyor belt 34 will be determined by the placement of the stack of leaves 12 and the rotation of the robotic arm 48. Placement of the leaf 12 onto the first belt 34 will be reflective guide to signal the robotic arm 48 that it is in the right position to put down the leaf 12. The leaf 12 will then travel towards a second photo eye 62 which reads a reflective line 52 down the middle of the first conveyor belt 34. This second photo eye 62 will trigger the meat transferring mechanism 44 when its beam is broken by the leaf 12 which is non-reflective. The meat transferring mechanism 44 will deposit the meat 14 on a second conveyor belt 54 at 90° to the first conveyor belt 34. The second conveyor belt 54 is a tributary which feeds the first conveyor belt 34. The second photo eye 62 using the same reflective strip will fire a pusher mechanism 60 when the leaf 12 is directly under the meat 14. The second conveyor belt 54 is a two-part conveyor, the first part will be slower moving and timed with the filling machine 79, while the second part will move faster and only after the pusher mechanism 60 fires and until the meat 14 is in the proper position to be pushed. This position will also be determined by use of the second photo eye 62. When the meat 14 breaks the beam of the second photo eye 62, the second conveyor belt 54 will stop, and the pusher mechanism 60 will await its signal to fire.

The leaf 12 now loaded with meat 14 travels down the first conveyor belt 34 toward the fold over plow 46. The fold over plows 46 will be lightly charged with air to provide a cushion of air that the sides of the leaf 12 will float on. Discharge of air will be constant and provided by a centrifugal blower 66. As the leading edge of the leaf 12 reaches the point it should begin rolling, a clamshell hook 47 riding on the first conveyor belt 34, combined with a sudden decline in the first conveyor belt 34 and a blast of air helps to roll the leading edge of the leaf 12 over the meat 14.

The clamshell hook 47 works by gravity and is forced out of the way of the leaf 12 by the force of the meat 14 and leaf 12. After the leaf 12 and meat 14 passes under it, it falls back into position. The air blast is triggered by a third photo eye 64 just before the rolling pad 81. Friction between the first conveyor belt 34, the leaf 12 and meat 14 and the rolling pad 81 causes the leaf 12 to roll. After rolling, the rolled grape leaf 12 is discharged and manually placed in a cooking basket.

In an alternative embodiment, the grape leaf 12 having the meat 14 loaded on it is moved by the first conveyor belt 34 to a fold over wedge 75 which forces the edges of the first conveyor belt to fold over toward each other as the first conveyor belt 34 passes through the fold over wedge 75. The first conveyor belt 34 is oriented in this folded position when the first conveyor belt 34 is positioned in place in the apparatus 10. The fold over wedge 75 maintains the first conveyor fell 34 in the folded position as it moves past the fold over wedge 75. Due to the fold over wedge 75 causing the first conveyor belt 34 to fold over, the leaf 12 on the first conveyor belt 34 is also folded over along its sides because the leaf 12 rests on the first conveyor belt 34 and follows the cross-sectional shape of the first conveyor belt 34 as it passes the fold over wedge 75.

After the first conveyor belt 34 passes the fold over wedge 75, the first conveyor belt 34 extends along a first vertical belt former 76 and a second vertical belt former 77 opposing the first belt former 76. The first and second vertical belt formers extend essentially perpendicular to the first conveyor belt 34 direction and cause the sides of the first conveyor belt 34 to extend essentially in parallel with them and perpendicular to the direction of movement of the first conveyor belt 34.

Between the first and second vertical belt formers is a stationary rolling pad 78 positioned essentially in the center between the first and second vertical belt formers and in spaced relationship to the first conveyor belt 34 so the first conveyor belt 34 can move underneath and past the stationary rolling pad 78. The stationary rolling pad 78 has a slot 79 which is connected to an air hose 80 through which air blows through the slot 79 onto the first conveyor belt 34. The force from the air causes the front of the leaf 12 to lift up and catch the front of the stationary rolling pad 78. As the first conveyor belt 34 continues to move along the stationary rolling pad 78, the stationary rolling pad 78 contacts the grape leaf, creating resistance against it and causing the grape leaf to roll over and capture the meat of the leaf 12. The first conveyor belt 34 continues to move passed the stationary rolling pad 78 moving the leaf 12 with the meat 14 past the stationary rolling pad 78 as it is completely rolled about the meat 14. Once the rolled grape leaf 12 with meat 14 is past the stationary rolling pad 78 the first and second vertical belt formers also end and the first conveyor belt 34 flattens out again with the rolled grape leaf having meat on it and proceeds for packaging.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method of making a grape leaf with meat comprising the steps of:

placing a grape leaf on a conveyor belt;

positioning a quantity of meat on said grape leaf;

transporting the grape leaf and meat to a rolling station;

rolling the grape leaf about the meat to form a rolled product; and packaging the rolled product.

\* \* \* \* \*